(12) United States Patent
Panzani et al.

(10) Patent No.: US 7,835,733 B1
(45) Date of Patent: Nov. 16, 2010

(54) SATELLITE TELECOMMUNICATION SYSTEM

(75) Inventors: François Panzani, St Sulpice sur Lèze (FR); Pierre K. Tossou, Toulouse (FR)

(73) Assignee: Thales, Neuilly Sur Seine (FR)

( * ) Notice: Subject to any disclaimer, the term of this patent is extended or adjusted under 35 U.S.C. 154(b) by 2771 days.

(21) Appl. No.: 09/722,299

(22) Filed: Nov. 28, 2000

(30) Foreign Application Priority Data

Nov. 29, 1999 (FR) .................................. 99 14974

(51) Int. Cl.
*H04W 40/00* (2009.01)

(52) U.S. Cl. ....................... 455/428; 455/427; 455/445; 455/446; 455/453; 455/450

(58) Field of Classification Search ................. 455/428, 455/427, 429, 450, 453, 445, 12.1, 446, 452.1, 455/13.3
See application file for complete search history.

(56) References Cited

U.S. PATENT DOCUMENTS

| | | | | | |
|---|---|---|---|---|---|
| 4,128,740 | A | * | 12/1978 | Graziano | 455/447 |
| 4,315,262 | A | * | 2/1982 | Acampora et al. | 342/352 |
| 4,799,253 | A | * | 1/1989 | Stern et al. | 455/448 |
| 5,257,019 | A | * | 10/1993 | Schwendeman et al. | 340/825.49 |
| 5,625,868 | A | * | 4/1997 | Jan et al. | 455/13.4 |
| 5,736,959 | A | * | 4/1998 | Patterson et al. | 342/354 |
| 6,157,621 | A | * | 12/2000 | Brown et al. | 370/310 |
| 6,215,776 | B1 | * | 4/2001 | Chao | 370/316 |

FOREIGN PATENT DOCUMENTS

WO        WO 99/43101        8/1999

* cited by examiner

*Primary Examiner*—Joseph H Feild
*Assistant Examiner*—Huy D Nguyen
(74) *Attorney, Agent, or Firm*—Sughrue Mion, PLLC

(57) ABSTRACT

A transmit-receive system on board a satellite for a telecommunication system within a region covered by the system. The region includes isolated areas. The system receives calls from any area and transmits them to the same area or another area using routing devices. The system combines the signals from the isolated areas into groups. Routing is effected between groups and each group is allocated all of the communication resources of the region. The routing systems are hardwired, for example.

13 Claims, 3 Drawing Sheets

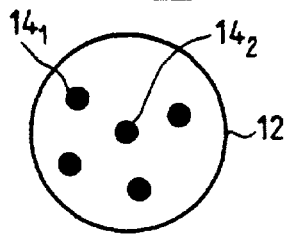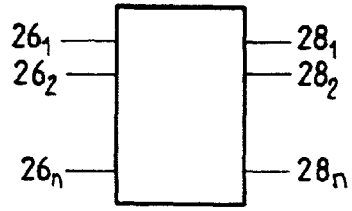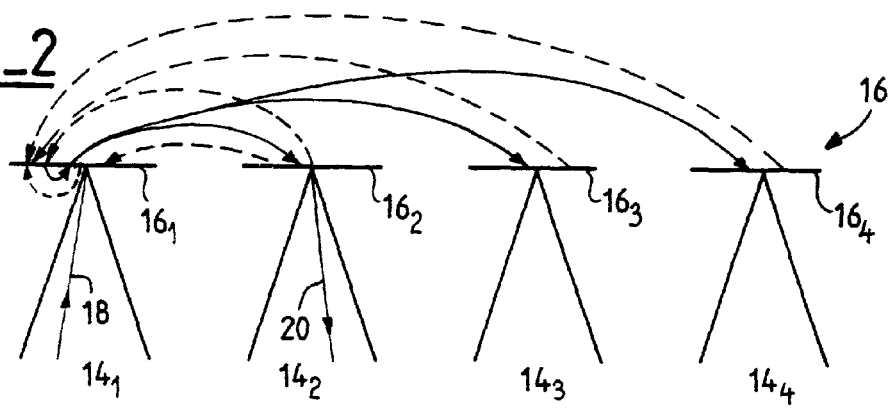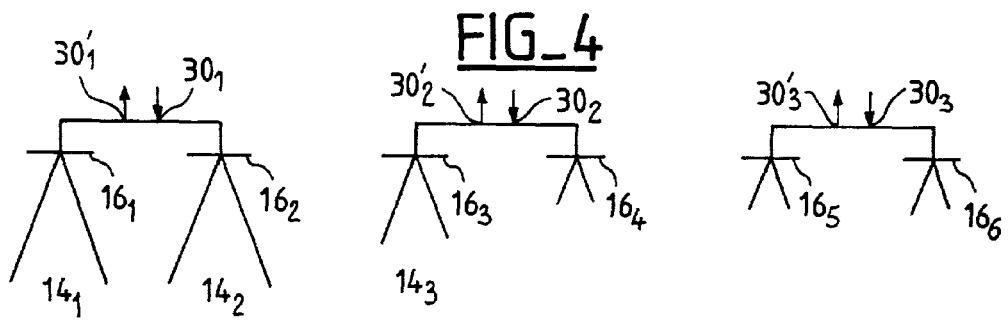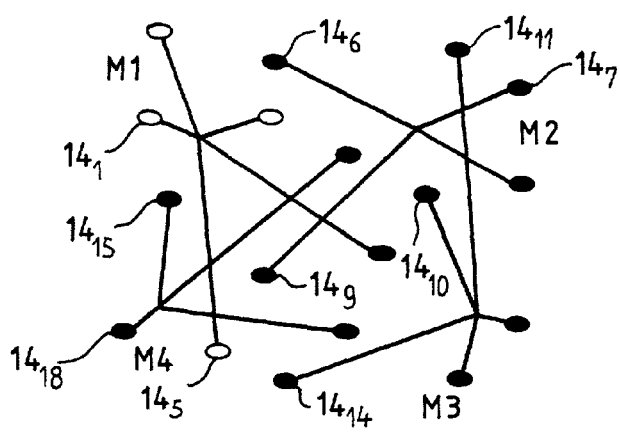

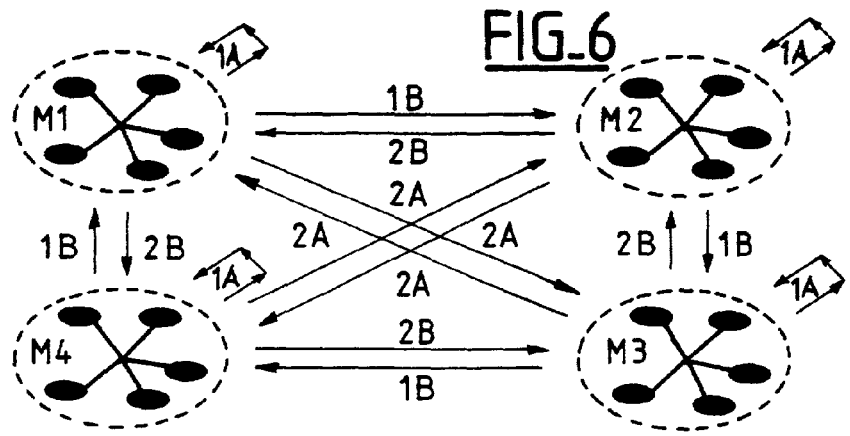
FIG_6
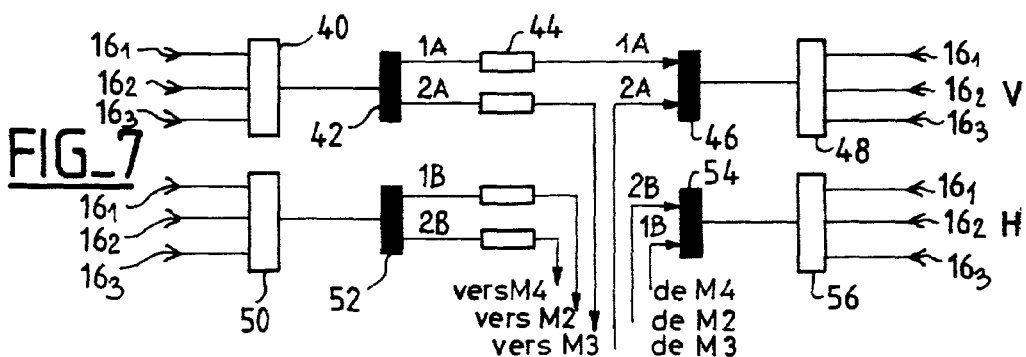
FIG_7
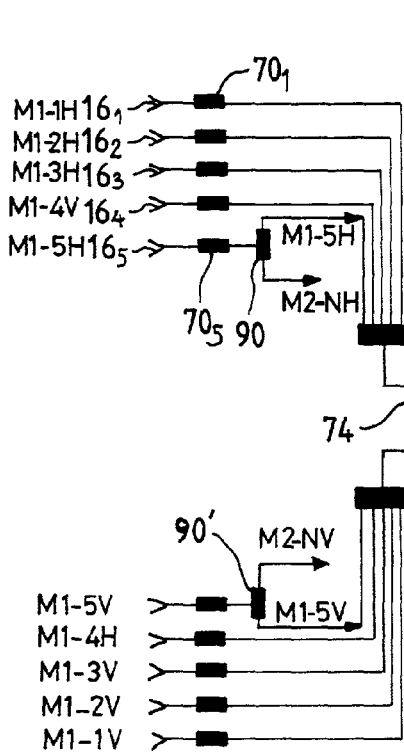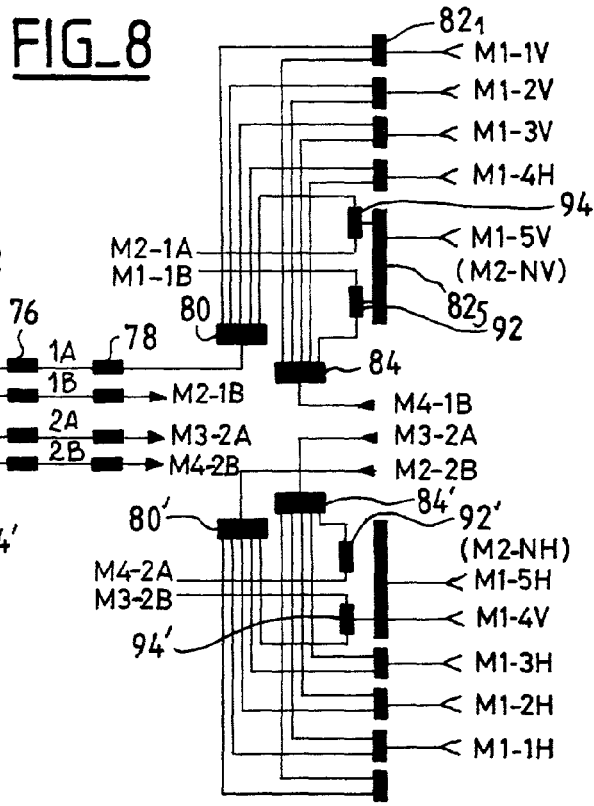
FIG_8

FIG_9
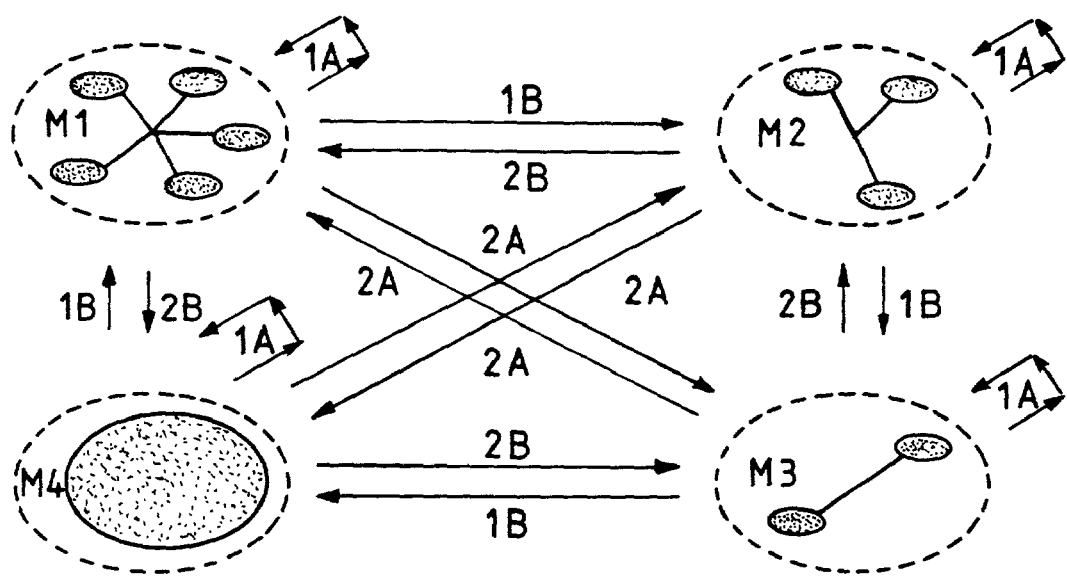

SATELLITE TELECOMMUNICATION SYSTEM

BACKGROUND OF THE INVENTION

1. Field of the Invention

The invention relates to a satellite telecommunication system.

2. Description of the prior art

Satellite telecommunication systems are expanding fast because they require an infrastructure which is less costly than that of cable or radio communication systems, in particular for transmitting calls over long distances.

A satellite telecommunication system, for example a geosynchronous system, includes, on board the spacecraft, a transponder including antenna systems and repeater means which receive incoming calls with particular resources, for example a particular frequency and a particular polarization, and transmit them, using other resources, to the destination specified by the call, in order to avoid interference between transmission and reception. In other words, a transmission is allocated a channel which is made up of two frequency/polarization pairs, for example, namely a given frequency and polarization pair for the call reaching the satellite (uplink) and a different frequency/polarization pair for the call retransmitted from the satellite (downlink).

Reducing the energy consumption of a satellite telecommunication system, for the same call capacity, improves its performance commensurately. Also, it is preferable for the resources on board the satellite to be of relatively simple and rugged design in order to minimize the risk of equipment failures.

Satellite transmission systems known in the art until now are of two types, namely a type providing global coverage of a region and a type covering a region by means of areas also known as spots.

In systems of the first type the antenna systems of the satellite have a transmit-receive diagram that covers the whole of the region concerned, which includes a number of urban areas, for example. A connection between two stations or two users is therefore relatively easy to effect because they are in the same antenna coverage area. However, a large coverage does not provide optimum performance. For the uplink, a large coverage area gives a low figure of merit (GT), which imposes the use of large antennas on the ground. For the downlink, a large coverage area requires a relatively high power consumption to provide the receiving station on the ground with a sufficient power density per unit surface area. Also, at any given time, each frequency can be used for only two transmissions, one with a given polarization and the other with the crossed polarization. In other words, a system of the above kind is very greedy in terms of bandwidth.

In the second type of system, the antenna system divides the region into a plurality of areas, each of which corresponds to a country or to a part of a country, for example. In this case, each area is allocated an antenna system whose performance is better than that of the antenna system of the first type of system. For transmissions or calls from one area to another, it is necessary to transmit the calls from one antenna system to another on board the satellite. This transfer from one antenna system to another is effected by permanent wiring or by a switching matrix.

The number of areas is relatively small to limit the wiring or the complexity of the switching matrix, which leads to wide aperture antenna systems whose performance is therefore not always optimum. What is more, permanent connections between antenna systems cannot adapt to traffic changes that may occur in the region concerned. If the traffic in an area increases significantly after the satellite is launched, the incoming call resources of the antenna system corresponding to that area cannot be modified, and because those resources were designed for a particular level of traffic, congestion can cause poor operation for calls uplinked from that area or downlinked to that area.

One way to remedy this drawback that is known in the art is to use dynamic switching matrices on board the satellite to connect the antenna systems corresponding to the various areas, so that the paths and resources in the matrix correspond to the traffic demand at all times. However, this type of dynamic matrix implies complex management and complicated synchronization, in particular between the ground and the satellite.

Nevertheless, compared to the global coverage type of system, the type of telecommunication system with a plurality of areas has the advantage of enabling the same frequency and polarization resources to be used for more than one area, provided that the areas are sufficiently far apart. The same frequency and the same polarization can be used for two far apart areas, this spatial discrimination providing the discrimination between the two calls using the same resources.

The invention relates to a telecommunication system of the second type, i.e. one in which each region is divided into areas. It allows for variations in traffic from one area to another without modification of the resources of the system on board the satellite. It also reduces the complexity of the connecting means between the antenna systems on board the satellite.

The telecommunication system according to the invention covers a region including non-contiguous densely populated areas and is characterized by combining the isolated areas on board the satellite into a plurality of groups each of which uses all of the communication resources allocated to the whole region.

The communication resources include, apart from the frequency bands of the carriers, the polarization, and the transmission times if multiple access techniques are used, for example the frequency division multiple access (FDMA), time division multiple access (TDMA) or code division multiple access (CDMA) technique. If the resources available are the frequency, the polarization and a time slot, at any time a single call or a single packet of a call can use the triplet comprising the frequency, polarization and time slot values. In contrast, another packet (or another call) can at the same time use, for example, the same frequency, a different polarization and the same time slot.

From the point of view of allocating resources, each group of areas is treated like an area in a conventional system.

Thus routing from one area to another on board the satellite is effected between groups and not between areas, which significantly simplifies implementation because the number of connections can be significantly smaller.

The connection between groups is preferably hardwired. Hardwiring is the simplest and most reliable implementation.

Simplicity and reliability also result from the fact that the number of connections is smaller than in prior art systems.

In one preferred embodiment of the invention the allocation of the areas in the groups is such that the traffic in the various groups is substantially equal.

Equalizing traffics between groups is preferable because each group is allocated all of the resources. Thus if an area in a group corresponds to a high level of traffic, that area is the only one in its group or is associated with low-traffic areas.

In other words, the areas to be grouped are chosen to equalize the traffic between the groups.

If the traffic increases in an area, it can be allocated a larger frequency band and/or time allocation and the area(s) in which the traffic has fallen can be allocated a smaller frequency band and/or time allocation.

To take account of traffic changes in the region, it is also possible to provide means for reconfiguring the groups, i.e. means for transferring an area initially allocated to one group to another group. This reconfiguration can be effected by remote-controlled switching means.

Note that the areas of a group can have any geographical distribution. It is not indispensable for them to be adjacent or close together.

SUMMARY OF THE INVENTION

The present invention provides a transmit-receive system on board a satellite for a telecommunication system within a region covered by that system, wherein the region includes isolated areas, the system receives calls from any area and transmits them to the same area or another area using routing means, the system includes means for combining the signals from the isolated areas into groups, routing is effected between groups and each group is allocated all of the communication resources of the region.

In one embodiment the routing means are hardwired.

In one embodiment the areas are allocated to the groups in such a manner that the traffic is substantially the same from one group to another.

In one embodiment the system includes switching means for modifying the composition of the groups so that at least one area can be transferred from one group to another.

In one embodiment the means for grouping the signals of several areas are part of the antenna system.

In one embodiment the means for grouping the signals of several areas use a beam-forming network.

In one embodiment the means for grouping the signals from several areas are part of repeater means.

In one embodiment the routing means allocate communication resources so that the signals received by a first group from a second group are distinguished from signals received from a third group by virtue of having different resources.

In one embodiment the resources allocated to the groups for interconnecting them include frequency bands.

In one embodiment the resources further include polarizations.

In one embodiment at least some of the areas corresponding to the same group are geographically far apart.

In one embodiment the number of areas in a group is from 1 to 10.

In one embodiment the number of groups is 4.

Other features and advantages of the invention will become apparent in the course of the following description of embodiments of the invention, which is given with reference to the accompanying drawings.

BRIEF DESCRIPTION OF THE DRAWINGS

FIG. 1 shows a region divided into a plurality of areas.

FIG. 2 is a diagram explaining the principle of operation of a prior art telecommunication system in which a region is divided into a plurality of areas.

FIG. 3 is a diagram of a switching matrix that can be used in the system shown in FIG. 2.

FIG. 4 is a simplified diagram of a system according to the invention.

FIG. 5 shows one aspect of the method according to the invention.

FIG. 6 is a diagram showing a further aspect of the system according to the invention.

FIG. 7 is a diagram showing part of one embodiment of a system according to the invention.

FIG. 8 is a diagram analogous to that of FIG. 7 for a variant of the invention and shows the reconfiguration of the system according to the invention.

FIG. 9 is a diagram analogous to that of FIG. 6 and shows a combination of three groups and a global coverage.

DETAILED DESCRIPTION OF THE PREFERRED EMBODIMENTS

In a conventional satellite telecommunication system, in particular a geosynchronous system, the satellite includes a set or system 16 of antennas (FIG. 2) covering a region 12 divided into areas $14_1$, $14_2$, etc. The problem addressed here is that of small (150 km to 400 km diameter) non-contiguous and densely populated urban areas. To each terrestrial urban area there corresponds a respective antenna system $16_1$, $16_2$, $16_3$, etc on board the satellite. For simplicity, only four antenna systems $16_1$ to $16_4$ and the corresponding four areas $14_1$ to $14_4$ are shown in FIG. 2.

To make the best possible use of the frequency band allocated to the telecommunication system, each area is allocated part or the whole of the frequency band and at least some of the separate areas can use the same band.

A channel is allocated for each transmission and consists of two frequency/polarization pairs, for example. To be more precise, for an uplink 18 (FIG. 2) a frequency $f_1$ is allocated, and is of course in the band allocated to the corresponding area $14_1$, and a particular polarization is allocated, for example vertical polarization. For the downlink 20, a frequency $f_2$ chosen in the band allocated to the corresponding area $14_2$ and vertical or horizontal polarization are allocated.

The frequencies $f_1$ and $f_2$ are usually different.

The uplink and downlink antenna systems are separate.

To connect the uplink 18 and the downlink 20, connection or routing means are required on board the satellite to enable the antenna systems $16_1$ and $16_2$ to communicate. To this end the transponder on board the satellite which converts received signals into transmitted signals includes wiring or a switching matrix (FIG. 3). Note that the wiring also includes the connection between the uplink and downlink for the same area. This is why the wiring or the switching matrix also connects each receive antenna system $16_i$ to the transmit antenna system $16_i$ of the same area, and vice versa.

Routing requires a signal picked up by an antenna system $16_1$ to be routed to any of the other antenna systems. Thus FIG. 2 shows in solid line the path from the antenna system $16_1$ to the other systems $16_2$, $16_3$, $16_4$. Each antenna system must also be able to receive signals from each of the other antenna systems. The paths terminating at the antenna system $16_1$ are shown in dashed line in FIG. 2.

If the connection means 24 are hardwired, i.e. if they cannot be modified by remote control after the satellite is launched, they are suited to a particular volume of traffic between areas and cannot easily accommodate a change in the traffic in the various areas. For instance, if an area such as the area $14_2$, for example, experiences a significant increase in traffic sometime after the satellite is launched, congestion can occur because the connections of the system $16_2$ to the other antenna systems cannot be modified.

To allow for instantaneous and long-term changes in traffic, a switching matrix 22 (FIG. 3) is sometimes used, usually having the same numbers of inputs $26_1$ to $26_n$ and outputs $28_1$ to $28_n$. A plurality of paths is provided in the matrix. The frequency or time resource allocated to one of the paths can vary as a function of the traffic. A matrix of this kind is particularly complex to manage, and usually has to be managed in real time. Control of the matrix 22 requires either complex synchronization, if the time allocated is variable, or costly and complex filters whose bandwidth can be modified by remote control.

To simplify the implementation of the connection means 24 it is beneficial to provide relatively large areas $14_i$ in order for the number of areas and therefore the number of antenna systems not to be too high, as the complexity of the wiring or switching increases with this number.

To absorb probable variations in traffic in each area and to simplify the connections on board the satellite, the invention combines the traffic corresponding to several areas into groups and effects routing between groups.

In the preferred embodiment of the invention, the areas to be grouped are chosen according to the traffic in each area and so that one or more high-traffic areas is associated with one or more low-traffic areas in each group, the overall traffic being substantially the same from one group to another.

The groups are also preferably reconfigurable, i.e. areas allocated to one group can subsequently be allocated to another group.

In the highly simplified example shown in FIG. 4, the antenna systems $16_1$ and $16_2$ corresponding to the areas $14_1$ and $14_2$ have been grouped together and therefore form a first group. Similarly, the antenna systems $16_3$ and $16_4$ form a second group and the antenna systems $16_5$ and $16_6$ form a third group.

The antenna systems $16_1$ and $16_2$ are connected to the same input-output $30_1$. Similarly, the antenna systems $16_3$ and $16_4$ are connected to the same input-output $30_2$ and the antenna systems $16_5$ and $16_6$ are connected to an input-output $30_3$.

Thus the connections are made from one group to another and not between antenna systems, i.e. between areas, which simplifies the connections or switching required on board the satellite.

The whole of the frequency band allocated to the region is allocated to each group and the usual frequency-sharing principles are applied to each group, instead of applying them to each area. In each group, a particular frequency allocated particular characteristics such as a polarization and/or a code can be used for only one transmission.

There can be any number of areas in a group, for example from 1 to 10 areas. Similarly, the geographical distribution of the areas combined in a group can be chosen at will and the areas need not all be contiguous or close together.

FIG. 5 shows a simplified example of groups of urban areas. In this example there are four groups M1, M2, M3, M4. The group M1 includes five areas $14_1$ to $14_5$. The group M2 includes four areas $14_6$ to $14_9$. The group M3 includes five areas $14_{10}$ to $14_{14}$ and the group M4 includes four areas $14_{15}$ to $14_{18}$.

FIG. 6 is a diagram explaining the principle of allocating communication resources for calls within the same group or for calls between groups. In this example, the frequency band allocated to a region is divided into two sub-bands 1 and 2 and vertical and horizontal polarization can be used in each sub-band. The symbol A corresponds to vertical polarization and the symbol B to horizontal polarization.

FIG. 6 shows that the resource 1A (sub-band 1 and vertical polarization) is used for a call in each group from one area to the same area or from one area to another area of the same group. The resource 1B is used for transmission from the group M1 to the group M2 and the resource 2B is used for transmission from M2 to M1. This diagram, which constitutes an integral part of this description, shows that the originating group of each transmission received by a group is clearly identifiable. Thus for the group M1, a call received with the resource 1A corresponds to a call from the same group, a call received with the resource 1B corresponds to a call from the group M4, a call received with the resource 2A comes from the group M3, and a call received with the resource 2B comes from the group M2.

If the polarization resource is not used, the frequency band is divided into four sub-bands.

Note that in the FIG. 6 example, in which there are four groups, there are 16 transponders. That number is significantly smaller than in the prior art, where connections were provided from each individual area to each other individual area.

Although until now it has been stated that grouping is effected by connection to the antenna systems, note that grouping can also be effected at repeater level. FIG. 7 shows the first situation (grouping at antenna system level) and FIG. 8 shows the second situation (grouping at repeater level).

Refer first to FIG. 7, which shows part of the connection means for a group M1.

In this example, grouping is effected by means of a beam-forming network of the antenna system.

It is assumed that three areas are provided for the group M1 with antenna systems $16_1$, $16_2$ and $16_3$, there are four groups and the communication resources are allocated as described with reference to FIG. 6.

The vertical polarization signals received by the antenna systems $16_1$, $16_2$, $16_3$ (coming from the areas $14_1$, $14_2$, $14_3$) are grouped by a first part 40 of the beam-forming network, which applies them to a first input demultiplexer 42 which has two outputs. Signals using the resource 1A are directed to the first of those outputs and signals using the resource 2A are directed to the second output. The signals using the resource 1A come from the group M1. They are intended for the same group (FIG. 6). Accordingly, the first output of the multiplexer 42 is connected via a power amplifier 44 to the first input of an output multiplexer 46. The second output of the demultiplexer 42, which receives the resource 2A, is directed to the group M3.

The second input of the multiplexer 46 receives the resource 2A. As shown in FIG. 6, the signals come from the group M3.

The output of the multiplexer 46 is directed to each of the transmit antenna systems $16_1$, $16_2$, $16_3$. The signals are distributed by another part 48 of the beam-forming network.

Similarly, the horizontal polarization resources received by the antenna systems $16_1$, $16_2$, $16_3$ are directed, by another part 50 of the beam-forming network, to an input demultiplexer 52 which has two outputs. The resources 1B appear on the first output and the resources 2B on the second output. Thus the signals 1B from the first output of the input demultiplexer 52 are directed to the group M2 and the signals 2B from the second output are directed to the group M4.

An output multiplexer 54 is provided for receiving horizontal polarization signals and has two inputs to which the respective resources 1B and 2B are applied. The resources 1B come from the group M4 and the resources 2B come from the group M2. The output of the multiplexer 54 directs the signals to the corresponding areas by passing them to the antenna systems $16_1$, $16_2$, $16_3$ with a distribution determined by a part 56 of the beam-forming network.

In this embodiment a power amplifier 44 is provided for transmitting each resource and a low-noise amplifier (not shown) is provided for receiving each resource.

In the example shown in FIG. 8, the grouping is effected in the repeater system rather than in the antenna system.

FIG. 8 shows only the part for routing the signals relating to the group M1. The group M1 includes five areas with corresponding antenna systems $16_1$ to $16_5$. As in the FIG. 7 example, each group is divided into two sub-groups. In this case, the first sub-group processes the signals from areas 1, 2, 3, 4 and 5 received with horizontal polarization for the signals from areas 1, 2, 3 and 5 and vertical polarization for the signals from area 4. These signals are respectively denoted M1-1H, M1-2H, M1-3H, M1-4V and M1-5H.

For transmission purposes, the first sub-group processes the signals to be transmitted with the crossed polarization, i.e. vertical polarization signals for the areas 1, 2, 3 and 5 and horizontal polarization signals for area 4.

The other signals are processed in the second sub-group, with vertical polarization for areas 1, 2, 3 and 5 and horizontal polarization for area 4 in the case of the received signals and horizontal polarization for areas 1, 2, 3 and 5 and vertical polarization for area 4 in the case of the transmitted signals.

Also, in this example, switching means are provided so that signals from one area can be reallocated to another group. In the example shown, area 5 of group M1 is reallocated to group M2.

The antenna system $16_1$ receiving the signals 1H (signals from area 1 of group M1 with horizontal polarization) are transmitted by a receiver 70, to a first input of a combiner 72 in the form of a beam-forming network. The other inputs of the combiner 72 receive the respective signals 2H, 3H, 4V and 5H.

The output of the combiner 72 is connected to the input of a demultiplexer 74 which provides the resources 1A and 1B on two respective outputs. The resources 1A and 1B are each processed by two amplifiers 76 and 78 in series, one of the amplifiers varying the gain and the other amplifier constituting a power amplifier.

The resource 1A is fed to the input of a divider 80 consisting of a beam-forming network which divides the resource 1A into five beams directed toward the transmit antennas $16_1$ to $16_5$, via first inputs of the multiplexers $82_1$ to $82_5$, respectively, each of which has two inputs. The second inputs of the multiplexers $82_1$ to $82_5$ are connected to the respective outputs of another divider 84 receiving at its input the resource 1B from group M4, in accordance with the distribution shown in FIG. 6.

The output of the demultiplexer 74 which delivers the resource 1B is directed via two amplifiers in series analogous to the amplifiers 76 and 78 to the group M2, also in accordance with FIG. 6.

The second sub-group is constituted in a similar manner to the first sub-group. The resource 2A appears at the first output of the demultiplexer 74' of the receive part and is directed to the group M3. The resource 2B appears at the second output of the same demultiplexer 74' and is directed to the group M4.

On the transmit side, the divider 84' receives at its input the resource 2A from the group M3 and the divider 80' receives at its input the resource 2B from the group M2.

To reallocate the area 5 from the group M1 to the group M2 so that it takes the number N, the receive part of the first sub-group includes a switch 90 with one input and two outputs. The input of the switch 90 receives the signals from the receiver $70_5$ and one of the outputs is connected, as shown, to an input of the combiner 72. The other output can be connected, when the switch is in its second position, to the input of a corresponding combiner of the group M2. This is why the second output is marked M2-NH.

Similarly, a switch 90' is provided in the second sub-group and, in the position shown, feeds the signal 5V from the group M1 to an input of the combiner 72' and, in its second position, feeds the corresponding signal to an input of an analogous combiner of the group M2.

When the area 5 is allocated to the group M2, on the transmit side, the signals NV (first sub-group) from the area allocated in this way to the group M2 must correspond to the distribution of resources shown in FIG. 6. Switches 92 and 94 are therefore provided for transmitting the resource 1A of the group M2 and the resource 1B of the group M1 via the corresponding antenna system.

Similarly, in the transmit part of the second sub-group, switches 92' and 94' are provided for transmitting, instead of the signals 5H of the group M1, signals NH of the group M2 with the resources 2A and 2B, the resources 2A coming from the group M4 and the resources 2B coming from the group M3.

The various switches 90, 90', 92, 94, 92', 94', etc can be controlled from the ground. They are operated from time to time to reallocate the groups, to allow for slow traffic changes.

The invention provides a simple way of connecting areas isolated from each other. It also enables connection to a conventional global coverage. Thus FIG. 9 shows three groups M1, M2 and M3 of isolated areas while the global coverage M4 is treated as a group for interconnection purposes.

In one embodiment, the terrestrial areas are substantially circular with a diameter from 150 km to 450 km and the Ku band is used for transmission. These areas are relatively small, which enables good isolation to allow frequency re-use. A small size for each area is also preferable because the areas are grouped on an antenna to form a group and each overall group must not be too large if the gain of the antenna is to remain sufficient.

The invention relates not only to means on board a satellite but also to means on the ground adapted to cooperate with the means on board the satellite to allocate the resources and group the areas.

There is claimed:

1. A transmit-receive system on board a satellite for a telecommunication system within a region covered by said system, wherein said region includes a plurality of areas including isolated areas, each area covered by a respective antenna on board said satellite, said system receives calls from any area and transmits said calls to the same area or another area, said system comprising:
   means for combining signals from said plurality of areas into groups and
   routing means for routing calls from any one of said groups to itself, or to another of said groups,
   wherein each group is allocated all of the communication resources of said region.

2. The system claimed in claim 1 wherein said routing means are hardwired.

3. The system claimed in claim 1 wherein said areas are allocated to said groups in such a manner that the traffic is substantially the same from one group to another.

4. The system claimed in claim 1 further comprising switching means for modifying the composition of said groups so that at least one area can be transferred from one group to another.

5. The system claimed in claim 1 wherein said means for combining said signals of several areas are part of an antenna system.

6. The system claimed in claim 5 wherein said means for grouping said signals of several areas use a beam-forming network.

7. The system claimed in claim 1 wherein said means for grouping said signals from several areas are part of repeater means.

8. The system claimed in claim 1 wherein said routing means allocate communication resources so that said signals received by a first group from a second group are distinguished from signals received from a third group by virtue of using different resources.

9. The system claimed in claim 8 wherein said resources allocated to said groups for interconnecting said groups include frequency bands.

10. The system claimed in claim 9 wherein said resources further include polarizations.

11. The system claimed in claim 1 wherein at least some of said areas corresponding to the same group are geographically far apart.

12. The system claimed in claim 1 wherein the number of areas in a group is from 1 to 10.

13. The system claimed in claim 1 wherein the number of groups is 4.

* * * * *